(12) United States Patent
Geusic et al.

(10) Patent No.: US 6,777,715 B1
(45) Date of Patent: Aug. 17, 2004

(54) INTEGRATED CIRCUITS USING OPTICAL WAVEGUIDE INTERCONNECTS FORMED THROUGH A SEMICONDUCTOR WAFER AND METHODS FOR FORMING SAME

(75) Inventors: Joseph E. Geusic, Berkeley Heights, NJ (US); Kie Y. Ahn, Chappaqua, NY (US); Leonard Forbes, Corvallis, OR (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/618,648

(22) Filed: Jul. 18, 2000

Related U.S. Application Data

(62) Division of application No. 09/031,961, filed on Feb. 26, 1998, now Pat. No. 6,090,636.

(51) Int. Cl.⁷ .................. H01L 27/15; H01L 31/12; H01L 33/00
(52) U.S. Cl. ................ 257/80; 257/99; 257/81; 257/621; 257/730; 438/65; 438/64; 438/74; 438/109
(58) Field of Search .............. 438/48, 58, 64, 438/65, 66, 67, 69, 72, 74, 77, 81, 107, 109, 40, 298, 457, 57, 608, 609, 683, 685; 257/80, 81, 99, 621, 730

(56) References Cited

U.S. PATENT DOCUMENTS

| | | | |
|---|---|---|---|
| 3,968,564 A | 7/1976 | Springthorpe | 29/580 |
| 4,920,070 A | 4/1990 | Mukai | 437/173 |
| 4,970,578 A | 11/1990 | Tong et al. | 357/81 |
| 5,128,831 A | 7/1992 | Fox, III et al. | 361/396 |
| 5,221,633 A | 6/1993 | Holm et al. | 437/51 |
| 5,352,998 A | 10/1994 | Tamino | 333/247 |
| 5,362,976 A | 11/1994 | Suzuki | 257/81 |
| 5,409,563 A | 4/1995 | Cathey | 156/643 |
| 5,416,872 A | 5/1995 | Sizer, II et al. | 385/92 |
| 5,431,775 A | 7/1995 | Prince | 216/24 |
| 5,489,554 A | 2/1996 | Gates | 437/208 |
| 5,532,506 A | 7/1996 | Tserng | 257/276 |
| 5,587,119 A | 12/1996 | White | 264/104 |
| 5,604,835 A | 2/1997 | Nakamura et al. | 385/129 |
| 5,641,545 A | 6/1997 | Sandhu | 427/573 |
| 5,656,548 A | 8/1997 | Zavracky et al. | 438/23 |

(List continued on next page.)

FOREIGN PATENT DOCUMENTS

| | | | | |
|---|---|---|---|---|
| JP | 56-055067 | 5/1981 | | H01L/23/52 |
| JP | 03-013907 | 1/1991 | | G02B/6/12 |
| JP | 05-145060 | 6/1993 | | H01L/29/44 |
| JP | 04-263462 | 9/1998 | | H01L/25/04 |
| WO | 91/11833 | 8/1991 | | H01R/9/00 |
| WO | 94/05039 | 3/1994 | | H01L/23/48 |

OTHER PUBLICATIONS

Forbes, L., et al., "Resonant Forward–Biased Guard–Ring Diodes for Suppression of Substrate Noise in Mixed–Mode CMOS Circuts", *Electronics Letters*, 31, 720–721, (Apr. 1995).

(List continued on next page.)

*Primary Examiner*—Long Pham
*Assistant Examiner*—Wai-Sing Louie
(74) *Attorney, Agent, or Firm*—Schwegman, Lundberg, Woessner & Kluth, P.A.

(57) ABSTRACT

An integrated circuit with a number of optical waveguides that are formed in high aspect ratio holes. The high aspect ratio holes extend through a semiconductor wafer. The optical waveguides include a highly reflective material that is deposited so as to line an inner surface of the high aspect ratio holes which may be filled with air or a material with an index of refraction that is greater than 1. These metal confined waveguides are used to transmit signals between functional circuits on the semiconductor wafer and functional circuits on the back of the wafer or beneath the wafer.

37 Claims, 4 Drawing Sheets

U.S. PATENT DOCUMENTS

| | | | |
|---|---|---|---|
| 5,682,062 A | 10/1997 | Gaul ........................... | 257/686 |
| 5,729,038 A | 3/1998 | Young et al. ............... | 257/460 |
| 5,742,100 A | 4/1998 | Schroeder et al. .......... | 257/778 |
| 5,760,478 A | 6/1998 | Rozso et al. ................ | 257/777 |
| 5,767,001 A | 6/1998 | Bertagnolli et al. ........ | 438/455 |
| 5,798,297 A | 8/1998 | Winnerl et al. ............. | 438/622 |
| 5,834,849 A | 11/1998 | Lane ........................... | 257/786 |
| 5,844,289 A | 12/1998 | Teranishi et al. ........... | 257/432 |
| 5,848,214 A | 12/1998 | Haas et al. .................. | 385/120 |
| 5,858,814 A | 1/1999 | Goossen et al. ............. | 438/107 |
| 5,858,877 A | 1/1999 | Dennison et al. ........... | 438/700 |
| 5,897,333 A | 4/1999 | Goossen et al. ............. | 438/455 |
| 5,900,674 A | 5/1999 | Wojnarowski et al. ...... | 257/774 |
| 5,901,050 A | 5/1999 | Imai ........................... | 361/820 |
| 5,902,118 A | 5/1999 | Hubner ....................... | 438/106 |
| 5,903,045 A | 5/1999 | Bertin et al. ................ | 257/621 |
| 5,915,167 A | 6/1999 | Leedy ......................... | 438/108 |
| 5,952,665 A | 9/1999 | Bhargava .................. | 250/483.1 |
| 5,963,088 A | 10/1999 | Czarnul et al. .............. | 330/69 |
| 6,090,636 A * | 7/2000 | Geusic et al. ................ | 438/31 |
| 6,122,187 A | 9/2000 | Ahn et al. .................... | 365/63 |
| 6,143,616 A | 11/2000 | Geusic et al. ............... | 438/389 |
| 6,150,188 A | 11/2000 | Geusic et al. ................ | 438/31 |
| 6,181,864 B1 | 1/2001 | Jang et al. ................... | 385/137 |
| 6,187,677 B1 | 2/2001 | Ahn ........................... | 438/667 |
| 6,198,168 B1 * | 3/2001 | Geusic et al. ............... | 257/774 |
| 6,281,042 B1 | 8/2001 | Ahn et al. ................... | 438/108 |

OTHER PUBLICATIONS

Foster, R., et al., "High Rate Low–Temperature Selective Tungsten", *In: Tungsten and Other Refractory Metals for VLSI Applications III*, V.A. Wells, ed., Materials Res. Soc., Pittsburgh, PA, 69–72, (1988).

Gong, S., et al., "Techniques for Reducing Switching Noise in High Speed Digital Systems", *Proceedings of the 8th Annual IEEE International ASIC Conference and Exhibit*, Austin, TX, 21–24, (1995).

Heavens, O., *Optical Properties of Thin Solid Silms*, Dover Pubs. Inc., New York, 155–206, (1965).

Horie, H., et al., "Novel High Aspect Ration Aluminum Plug for Logic–DRAM LSI's Using Polysilicon–Aluminum Substitute", *Technical Digest: IEEE International Electron Devices Meeting*, San Francisco, CA, 946–948, (1996).

Kim, Y.S., et al., "A Study on Pyrolysis DMEAA for Selective Deposition of Aluminum", *In: Advanced Metallization and Interconnect Systems for ULSI Applications in 1995*, R.C. Ellwanger, et al., (eds.), Materials Research Society, Pittsburgh, PA, 675–680, (1996).

Klaus, et al., "Atomic Layer Controlled Growth of SiO 2 Films Using Binary Reaction Sequence Chemistry",*Applied Physics Lett. 70*(9), 1092–94, (Mar. 3, 1997).

Lehmann, et al., "A Novel Capacitor Technology Based on Porous Silicon", *Thin Solid Films 276, Elsevier Science*, 138–42, (1996).

Lehmann, V., "The Physics of Macropore Formation in Low Doped n–Type Silicon", *Journal of the Electrochemical Society, 140 (10)*, 2836–2843, (Oct. 1993).

Masu, K., et al., "Mutilevel Metallization Based on Al CVD", *1996 IEEE Symposium on VLSI Technology, Digest of Technical Papers*, Honolulu, HI, 44–45, (Jun. 11–13, 1996).

McCredie, B.D., et al., "Modeling, Measurement, and Simulation of Simultaneous Switching Noise", *IEEE Transactions on Components, Packaging, and Manufacturing Technology—Part B, 19*, 461–472, (Aug. 1996).

Muller, K., et al., "Trench Storage Node Technology for Gigabit DRAM Generations", *Digest IEEE International Electron Devices Meeting*, San Francisco, CA, 507–510, (Dec. 1996).

Ohba, T., et al., "Evaluation on Selective Deposition of VCD W Films by Measurement of Surface Temperature", *In: Tungsten and Other Refractory Metals for VLSI Applications II*, Materials Research Society, Pittsburgh, PA, 59–66, (1987).

Ohba, T., et al., "Selective Chemical Vapor Depostion of Tungsten Using Silane and Polysilane Reductions", *In: Tungsten and Other Refarctory Metals for VLSI Applications IV*, Materials Research Society, Pittsburgh, PA, 17–25, (1989).

Ott, A.W., et al., "Al303 Thin Films Growth on Si(100) Using Binary Reaction Sequence Chemistry", *Thin Solid Films, vol. 292*, 135–44, (1997).

Ramo, S., et al., *Fields and Waves in Communication Electronics, Third Edition*, John Wiley & Sons, Inc., pp. 428–433, (1994).

Senthinathan, R., et al., "Reference Plane Parasitics Modeling and Their Contribution to the Power and Ground Path "Effective" Inductance as Seen by the Output Drivers", *IEEE Transactions on Microwave Theory and Technqieus, 42*, 1765–1773, (Sep. 1994).

Stanisic, B.R., et al., "Addressing Noise Decoupling in Mixed–Signal IC's: Power Distribution Design and Cell Customization", *IEEE Journal of Solid–State Circuits, 30*, 321–326, (Mar. 1995).

Suntola, T., "Atomic Layer Epitaxy", *Handbook of Crystal Growth 3, Thin Films of Epitaxy, Part B: Growth Mechanics and Dynamics, Elsevier, Amsterdam*, 601–63, (1994).

Sze, S.M., *VLSI Technology, 2nd Edition, Mc Graw–HIll, NY*, 90, (1988).

Vittal, A., et al., "Clock Skew Optimization for Ground Bounce Control", *1996 IEEE/ACM International Conference on Computer–Aided Design, Digest of Technical Papers*, San Jose, CA, 395–399, (Nov., 10–14, 1996).

Wooley, et al., "Experimental Results and Modeling Techniques for Substrate Noise in Mixed Signal Integrated Ciruits", *IEEE Journal of Solid State Circuits, vol. SC–28*, 420–30 (1993).

* cited by examiner

INTEGRATED CIRCUITS USING OPTICAL WAVEGUIDE INTERCONNECTS FORMED THROUGH A SEMICONDUCTOR WAFER AND METHODS FOR FORMING SAME

This application is a divisional of U.S. application Ser. No. 09/031,961, filed on Feb. 26, 1998, U.S. Pat. No. 6,090,636.

TECHNICAL FIELD OF THE INVENTION

The present invention relates generally to the field of integrated circuits and, in particular, to integrated circuits using optical Waveguide interconnects formed through a semiconductor wafer and methods for forming same.

BACKGROUND OF THE INVENTION

Electrical systems typically use a number of integrated circuits that are mounted on a printed circuit board. The individual integrated circuits of the system are typically fabricated on different wafers. Each wafer is tested and separated into individual dies or chips. Individual chips are then packaged as individual integrated circuits. Each integrated circuit includes a number of leads that extend from the packaging of the circuit. The leads of the various integrated circuits, are interconnected to allow information and control signals to be passed between the integrated circuits such that the system performs a desired function. For example, a personal computer includes a wide variety of integrated circuits, e.g., a microprocessor and memory chips, tat are interconnected on one or more printed circuit boards in the computer.

While printed circuit boards are useful for bringing together separately fabricated and assembled integrated circuits, the use of printed circuit boards creates some problems which are not so easily overcome. For example, printed circuit boards consume a large amount of physical space compared to the circuitry of the integrated circuits which are mounted to them. It is desirable to reduce the amount of physical space required by such printed circuit boards. Further, assuring the electrical integrity of interconnections between integrated circuits mounted on a printed circuit board is a challenge. Moreover, in certain applications, it is desirable to reduce the physical length of electrical interconnections between devices because of concerns with signal loss or dissipation and interference with and by other integrated circuitry devices.

A continuing challenge in the semiconductor industry is to find new, innovative, and efficient ways of forming electrical connections with and between circuit devices which are fabricated on the same and on different wafers or dies. Relatedly, continuing challenges are posed to find and/or improve upon the packaging techniques utilized to package integrated circuitry devices. As device dimensions continue to shrink, these challenges become even more important.

For reasons stated above, and for other reasons stated below which will become apparent to those skilled in the art upon reading and understanding the present specification, there is a need in the art for an improved technique for interconnecting individual integrated circuits in an electronic system.

SUMMARY OF THE INVENTION

The above mentioned problems with integrated circuits and other problems are addressed by the present invention and will be understood by reading and studying the following specification. Integrated circuits are described which use optical waveguides that extend through the thickness of a semiconductor substrate or wafer so as to allow communication between integrated circuits formed on opposite sides of a single wafer, on opposite sides of two wafers that are bonded together, formed on wafers in a stack that are bonded together, or other appropriate configuration of wafers.

In particular, in one embodiment, a method for interconnecting first and second integrated circuits is provided. The first integrated circuit is formed on a working surface of a fist semiconductor substrate. At least one high aspect ratio hole is formed through the first semiconductor substrate. The high aspect ratio hole is lined with a material having a high reflectivity for light to form an optical waveguide. The first integrated circuit is coupled to the second integrated circuit through the optical waveguide. In one embodiment, the second integrated circuit is formed on a second surface of the first semiconductor substrate, opposite the working surface of the first semiconductor substrate. In another embodiment, the second integrated circuit is formed on a working surface of a second semiconductor substrate. The second semiconductor substrate is bonded to the first semiconductor substrate such that the first and second integrated circuits are coupled together through the optical waveguide in the first semiconductor substrate. In another embodiment, the surfaces of the first and second semiconductor substrates that are bonded together are located on sides of the first and second semiconductor substrates that are opposite the working surfaces of the first and second semiconductor substrates, respectively.

In another embodiment, an electronic system is provided. The electronic system includes at least one semiconductor wafer. The electronic system includes a number of integrated circuits. At least one integrated circuit is formed on the at least one semiconductor wafer. The at least one semiconductor wafer includes at least one optical waveguide formed in a high aspect ratio hole that extends through the thickness of the at least one semiconductor wafer. Further, at least one optical transmitter and at least one optical receiver are associated with the at least one optical waveguide. The optical transmitter and optical receiver transmit optical signals between selected integrated circuits of the electronic system.

In another embodiment, an integrated circuit is provided. The integrated circuit includes a functional circuit formed on a wafer. A number of optical waveguides are formed in high aspect ratio holes that extend through the wafer. The optical waveguides include a highly reflective material that is deposited so as to line an inner surface of the high aspect ratio holes.

In another embodiment, a method for forming an integrated circuit in a semiconductor wafer with an optical waveguide that extends through the semiconductor wafer is provided. A functional circuit is formed in a first surface of a semiconductor wafer. A number of etch pits are formed in the first surface of the semiconductor wafer at selected locations in the functional circuit An anodic etch of the semiconductor wafer is performed such that high aspect ratio holes are formed through the semiconductor wafer from the first surface to a second, opposite surface. A highly reflective layer of material is formed on an inner surface of the high aspect ratio holes such that the holes have an opening extending through the semiconductor wafer with a diameter that is at least three times the cut-off diameter. The optical fiber is selectively coupled to the functional circuit.

In another embodiment, a method for forming an optical waveguide through a semiconductor substrate is provided.

The method includes forming at least one high aspect ratio hole through the semiconductor substrate that passes through the semiconductor substrate from a first working surface to a surface opposite the first working surface. Further, the high aspect ratio hole is lined with a material having a high reflectivity for light. In one embodiment, the at least one high aspect ratio hole is etched in the semiconductor substrate using an anodic etch. In one embodiment, etch pits are formed in the working surface of the semiconductor substrate prior to the anodic etch such that the at least one high aspect ratio hole is formed at the location of the etch pits. In one embodiment, the high aspect ratio holes are lined with a layer of tungsten and a layer of aluminum. In one embodiment, the tungsten layer is formed using a silicon reduction process and a silane reduction process. In one embodiment, the high aspect ratio hole is lined with a layer of aluminum material. In one embodiment, the layer of aluminum material has a thickness of approximately 300 angstroms. In one embodiment, the optical waveguide includes an opening extending through the semiconductor substrate with a cross-sectional diameter of at least three times the cut-off diameter.

DETAILED DESCRIPTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

In the following description, the terms wafer and substrate are interchangeably used to refer generally to any structure on which integrated circuits are formed, and also to such structures during various stages of integrated circuit fabrication. Both terms include doped and undoped semiconductors, epitaxial layers of a semiconductor on a supporting semiconductor or insulating material, combinations of such layers, as well as other such structures that are known in the art.

The term "horizontal" as used in this application is defined as a plane parallel to the conventional plane or surface of a wafer or substrate, regardless of the orientation of the wafer or substrate. The term "vertical" refers to a direction perpendicular to the hormonal as defined above. Prepositions, such as "on", "side" (as in "sidewall"), "higher", "lower", "over" and "under" are defined with respect to the conventional plane or surface being on the top surface of the wafer or substrate, regardless of the orientation of the wafer or substrate.

Figure 1A:
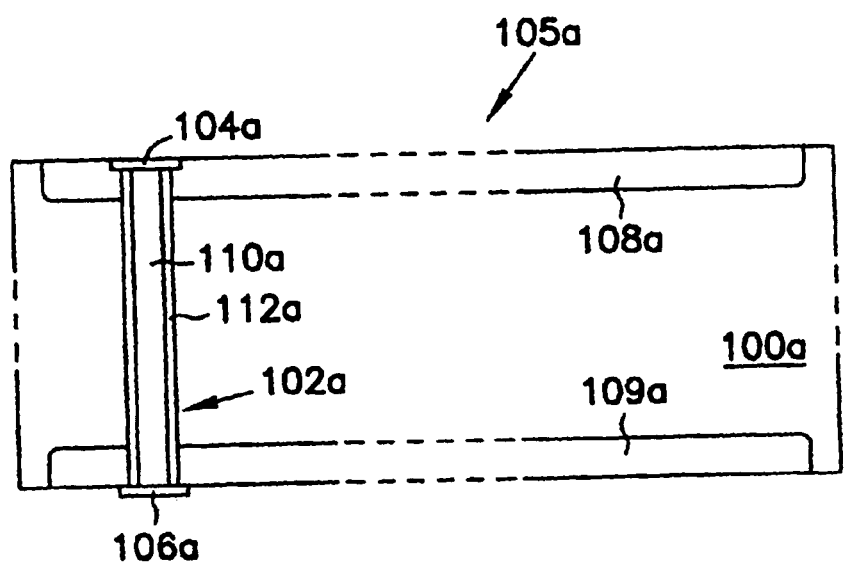
FIGS. 1A, 1B, and 1C are elevational views of exemplary embodiments of integrated circuits that use a semiconductor wafer having an optical waveguide formed in an high aspect ratio hole that extends through the semiconductor wafer according to the teachings of the present invention.

FIG. 1A is an elevational view of an embodiment of the present invention. Electronic system 105a includes semiconductor wafer 100a Semiconductor wafer 100a includes at least one optical waveguide 102a that provides a path for transmitting signals between functional circuit 108a on a first working surface of semiconductor wafer 100a and functional circuit 109a on a second, opposite working surface of semiconductor wafer 100a. It is noted that a number of optical waveguides can be formed through semiconductor wafer 100a. The single optical waveguide 102a is shown by way of example and not by way of limitation.

Optical waveguide 102a is formed in a high aspect ratio hole in semiconductor wafer 100a. The high aspect ratio hole is formed using, for example, an anodic etching technique as described in more detail below. Typically, the high aspect ratio holes have an aspect ratio in the range of approximately 100 to 200. Conventionally, a semiconductor wafer has a thickness in the range of approximately 100 to 1000 microns. Thus, the high aspect ratio holes used to form the optical waveguides can be fabricated with a diameter that is in the range from approximately 0.5 microns to approximately 10 microns.

Optical waveguide 102a is coupled to functional circuits 108a and 109a. For example, optical transmitter 104a is coupled to one end of optical waveguide 102a and optical receiver 106a is coupled to a second, opposite end of optical waveguide 102a. Optical transmitter 104a is also coupled to a node of functional circuit 108a and optical receiver 106a is coupled to a node of functional circuit 109a. In one embodiment, optical transmitter 104a comprises a gallium arsenide transmitter that is bonded to a surface of semiconductor wafer 100a using conventional wafer bonding techniques. In this embodiment, optical receiver 106a comprises a silicon photodiode detector formed in a surface of semiconductor wafer 100a. In other embodiments, other appropriate optical receivers and transmitters may be used to transmit signals over optical waveguide 102a.

Optical waveguides 102a include reflective layer 110a and hollow core 112a. Reflective layer 110a comprises a highly reflective material such as aluminum or other material that can be used to line the high aspect ratio hole with a mirror-like surface. When aluminum is used, a thickness of approximately 300 angstroms effectively achieves full reflectivity.

Reflective layer 110a serves to contain optical waves within optical waveguide 102a. This is desirable for at least two reasons. First, this reduces loss of the optical signal into the surrounding semiconductor material of wafer 100a. Second, this also reduces photogeneration of carriers in the surrounding semiconductor material of wafer 100a that might interfere with normal operation of other integrated circuitry in electrical system 105a.

Optical waveguide 102a should have sufficient diameter to be above cut-off for transmission of light waves. Equation (1) can be used to determine the cut-off diameter, $D_0$, for transmission of optical waves in the optical waveguide. Optical waveguide 102a should have a diameter that is at least three times the cut-off diameter. In some cases, a diameter that is ten times the cut-off diameter can be used.

$$D_0 = 0.59 \frac{\lambda_0}{n} \tag{1}$$

The term $\lambda_0$ is the free-space wavelength and n is the index of refraction for the material within the optical guide. For a case where $\lambda_0$ is 1 micron and n is 1 (e.g., air in the center of the waveguide), a 6 micron diameter for optical waveguide 102 is reasonable.

It is noted that optical waveguide 102a could be filled with a material with an index of refraction that is greater than 1. However, the material used for reflective layer 110, e.g., aluminum, would have to survive the deposition of the material.

Optical waveguides can be added to circuits using a conventional layout for the circuit without adversely affecting the surface area requirements of the circuit. Conventional circuits typically include pads formed on the top surface of the semiconductor wafer that are used to connect to leads of the integrated circuit through bonding wires. Advantageously, the bonding wires of conventional circuits can be replaced by optical waveguides 102a to allow signals to be passed between various integrated circuits of electrical system 105a without the need to attach the individual integrated circuits to a printed circuit board. This allows a substantial space savings in the design of electrical systems along with overcoming concerns related to signal loss or dissipation and interference with and by other integrated circuitry devices in the electrical system.

Figure 1B:
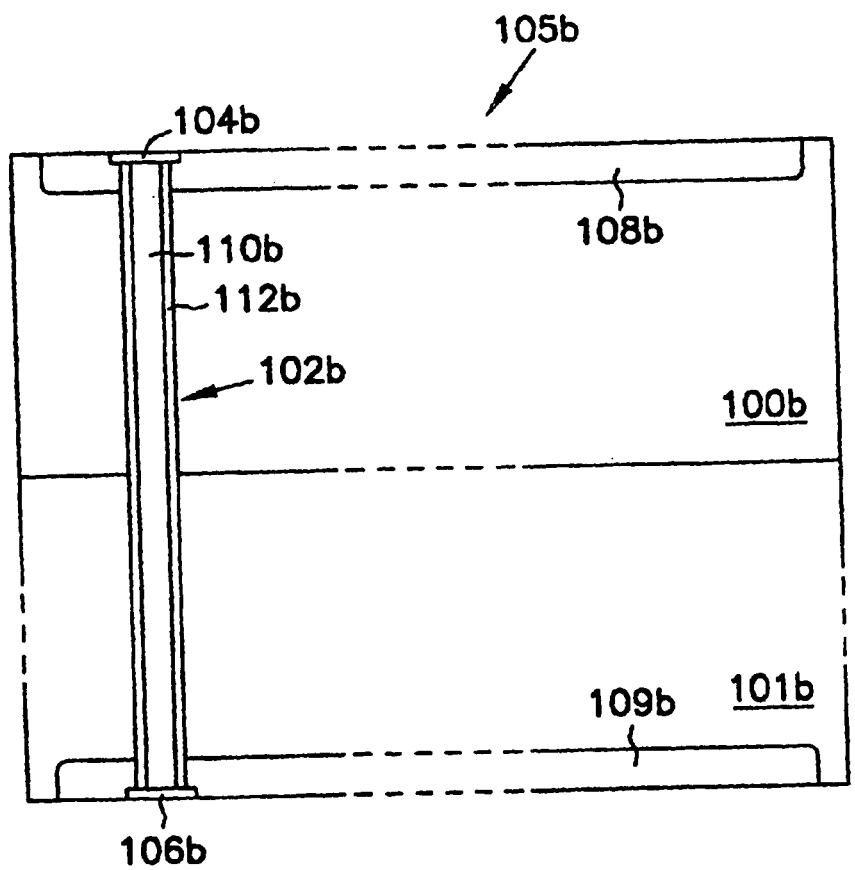
Figure 1C:
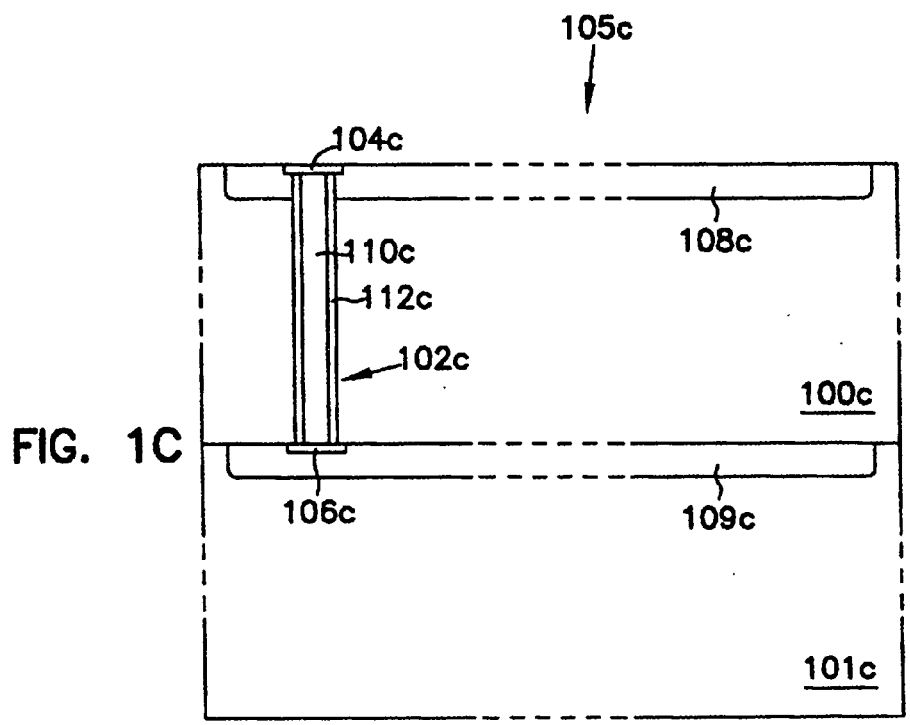

FIGS. 1B and 1C show additional embodiments of electronic systems using optical waveguides formed through integrated circuits to interconnect various integrated circuits. In the embodiment of FIG. 1B, integrated circuits 108b and 109b are formed in working surfaces of semiconductor wafers 100b and 101b. Surfaces opposite the working surfaces of semiconductor wafers 100b and 101b are bonded together using conventional wafer bonding techniques. Optical waveguide 102b transmits signals between integrated circuits 108b and 109b. A portion of optical waveguide 102b is formed in each of the semiconductor wafers 100b and 101b. In the embodiment of FIG. 1C, semiconductor wafers 100c and 101c are stacked with the working surface of semiconductor wafer 101c beneath the surface of semiconductor wafer 100c that is opposite the working surface of semiconductor wafer 100c. In this embodiment, optical waveguide 102c is formed within semiconductor wafer 100c.

FIGS. 2, 3, 4, 5, and 6 are views of semiconductor wafer 200 at various points of an illustrative embodiment of a method for forming optical waveguides through a semiconductor wafer according to the teachings of the present invention. Functional circuit 202 is formed in an active region of semiconductor wafer 200. For purposes of clarity, the Figures only show the formation of two optical waveguides through semiconductor wafer 200. However, it is understood that with a particular functional circuit any appropriate number of optical waveguides can be formed. Essentially, the optical waveguides are formed in the same space on the surface of semiconductor wafer 200 that is conventionally used to form bonding pads for leads. In a conventional circuit, the leads of the integrated circuit are connected to a printed circuit board which routes signals to other integrated circuits. The optical waveguides advantageously remove the need for a printed circuit board to interconnect the functional circuits formed on individual semiconductor wafers.

Figure 2:
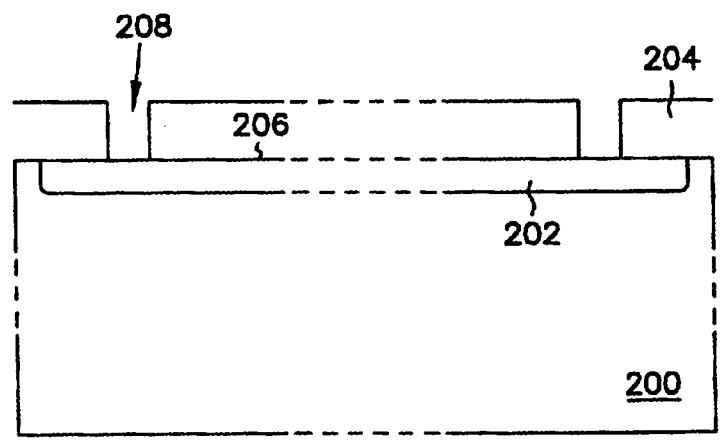
FIGS. 2, 3, 4, 5, and 6 are views of a semiconductor wafer at various points of an illustrative embodiment of a method for forming an optical waveguide through the wafer according to the teachings of the present invention.

As shown in FIG. 2, photo resist layer 204 is formed on surface 206 of semiconductor substrate 200. Photo resist layer 204 is patterned to provide openings 208 at points on surface 206 where high aspect ratio holes are to be formed through semiconductor wafer 200.

Figure 3:
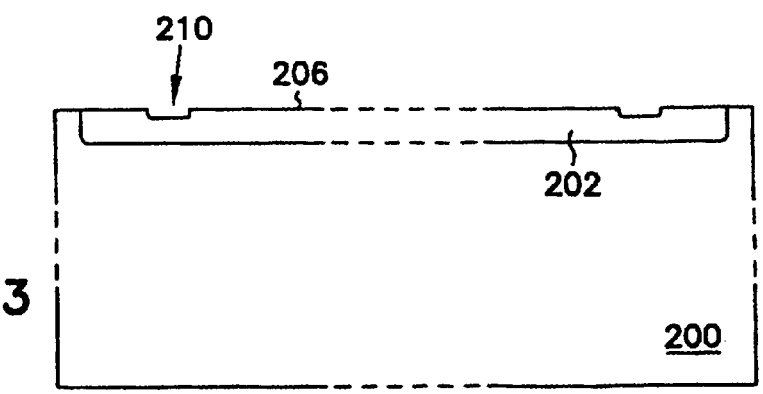

As shown in FIG. 3, etch pits 210 are formed by standard alkaline etching through openings 208 in photo resist layer 204. Photo resist layer 204 is then removed.

Figure 4:
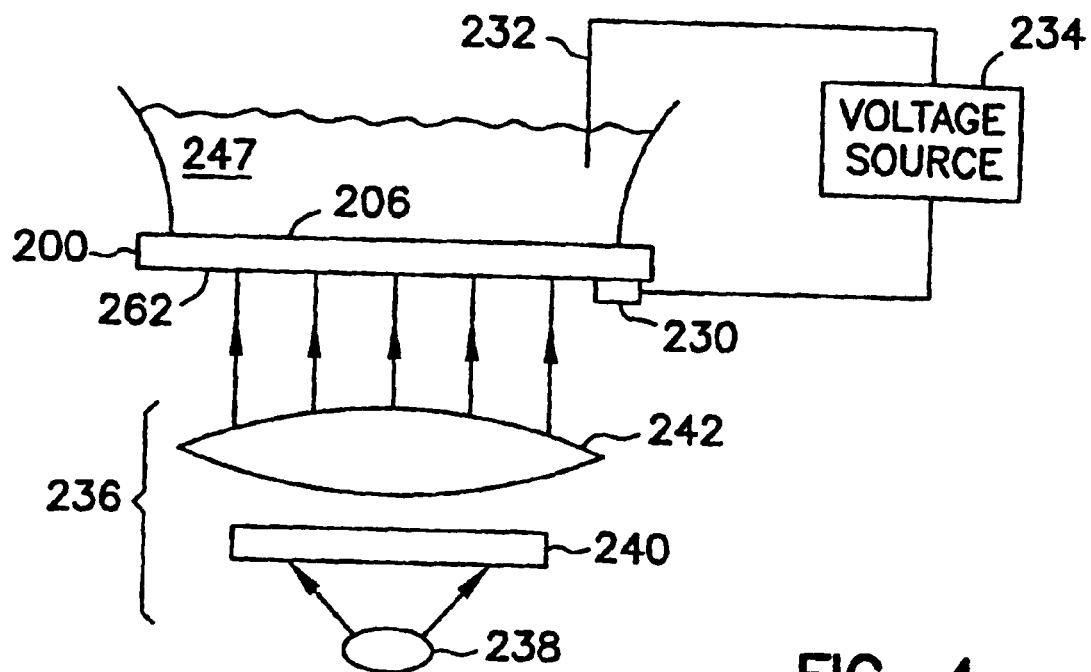
Figure 5:
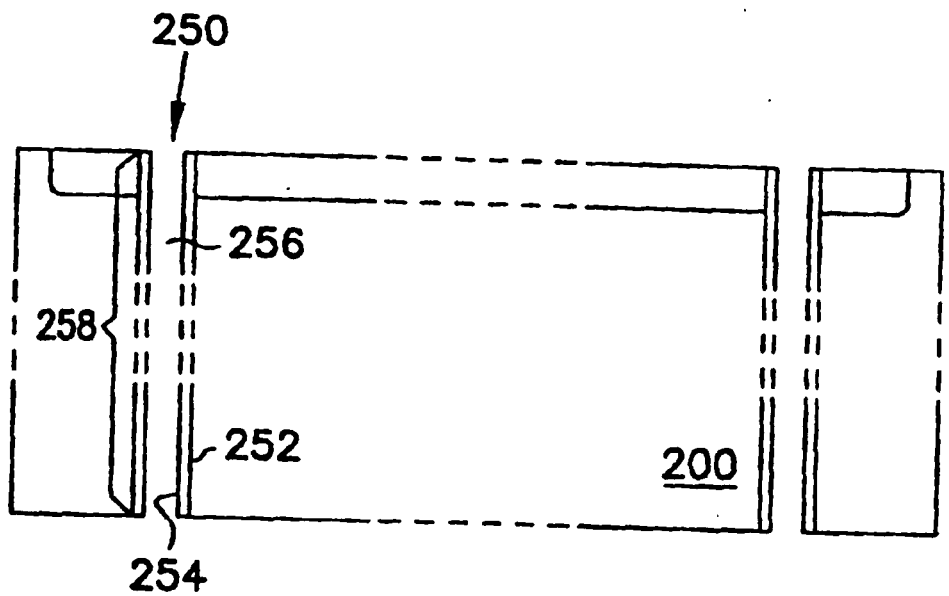

FIG. 4 is a schematic diagram that illustrates an embodiment of a layout of equipment used to carry out an anodic etch that is used to form high aspect ratio holes 250 of FIG. 5. Typically, holes 250 have an aspect ratio in the range of 100 to 200. Bottom surface 262 of semiconductor wafer 200 is coupled to voltage source 234 by positive electrode 230. Further, negative electrode 232 is coupled to voltage source 234 and is placed in a bath of 6% aqueous solution of hydrofluoric acid (HF) on surface 206 of semiconductor wafer 200.

In this example, illumination equipment 236 is also included because semiconductor wafer 200 is n-type semiconductor material. When p-type semiconductor material is used, the illumination equipment is not required. Illumination equipment 236 assures that there is a sufficient concentration of holes in semiconductor wafer 200 as required by the anodic etching process. Illumination equipment 236 includes lamp 238, IR filter 240, and lens 242. Illumination equipment 236 focuses light on sure 262 of semiconductor wafer 200.

In operation, the anodic etch etches high aspect ratio holes through semiconductor wafer 200 at the location of etch pits 210. Voltage source 234 is turned on and provides a voltage across positive and negative electrodes 230 and 232. Etching current flows from surface 206 to positive electrode 230. This current forms the high aspect ratio holes through semiconductor wafer 200. Further, illumination equipment illuminates surface 262 of semiconductor wafer 200 so as to assure a sufficient concentration of holes for the anodic etching process. The size and shape of the high aspect ratio holes through semiconductor wafer 200 depends on, for example, the anodization parameters such as HF concentration, current density, and light illumination. An anodic etching process is described in V. Lehmann, *The Physics of Macropore Formation in Low Doped n-Type Silicon*, J. Electrochem. Soc., Vol. 140, No. 10, pp. 2836–2843, October 1993, which is incorporated herein by reference.

Figure 6:
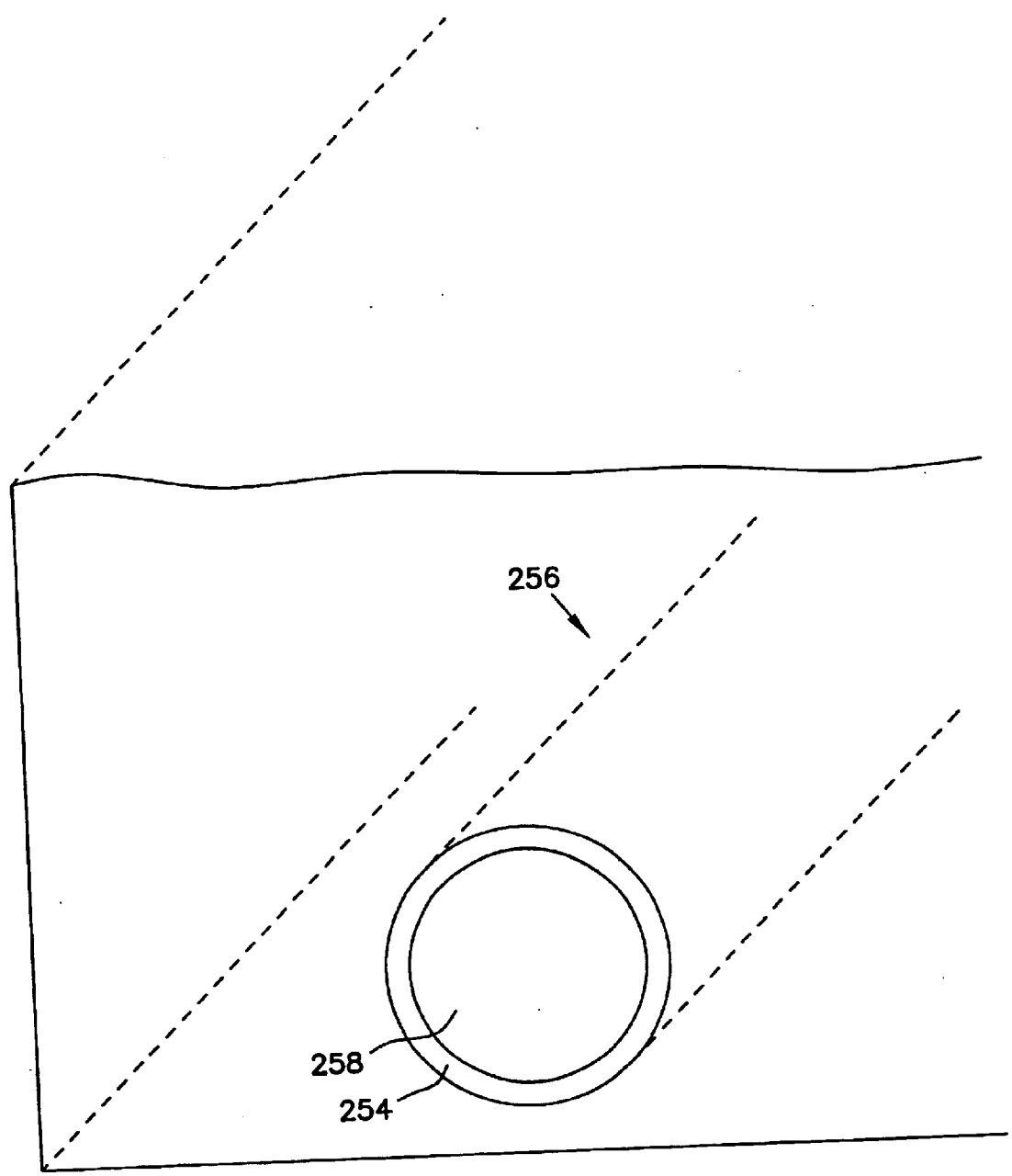

As shown in FIGS. 5 and 6, reflective layer 254 is formed on inner surface 252 of high aspect ratio holes 250. In one embodiment, reflective layer 254 comprises a metallic mirror that is deposited with a self-limiting deposition process. This produces a reflective surface for optical waveguide 256 that is substantially uniform. Waveguide 256 also has a center void 258 that is essentially filled with air.

A two-step, selective process is used, for example, to deposit tungsten as a portion of reflective layer 254. This is a low-pressure chemical vapor deposition (LPCVD) process. In this process, atoms in semiconductor wafer 200, e.g., silicon, are replaced by tungsten atoms in a reaction gas of $WF_6$. This is referred to as a "silicon reduction process." The limiting thickness of this process is approximately 5 to 10 nanometers. This thickness may not be sufficient for reflective layer 254. Thus, a second reduction process can be used to complete the deposition of tungsten. This second reduction step uses silane or polysilane and is thus referred to as a "silane reduction." The silane reduction process also uses $WF_6$. In this process, the deposition rate is highly dependent on the temperature and the reaction gas flow rate. For example, at 300° Celsius, tungsten deposits at a rate as high as 1 micron per minute using $WF_6$ flow rate of 4 standard cubic centimeters per minute in a cold-wall chemical vapor deposition (CVD) reactor.

When tungsten is used for reflective layer 254, a thin film of a material with a higher reflectivity is deposited on the tungsten material. For example, an aluminum film can be deposited at low temperature, e.g., in the range from 180° to 250° Celsius. Dimethylaluminum hydride is often used as the precursor when depositing aluminum because of its thermal stability and high vapor pressure. Further, the deposition of aluminum can be carried out with hydrogen as a carrier gas with wafer 200 maintained at a temperature of approximately 250° Celsius and a pressure of approximately 5 Torr. The typical deposition rate for this process is less than 100 nanometers per minute. It is noted that the aluminum could be deposited on a silicide as well. Aluminum can be deposited on a silicide at a much lower temperature, e.g., 100° Celsius, with a very high deposition rate using dimethylethylaminealane (DMEAA). Deposition rates of 500 nanometers per minute have been reported using this technique at 150° Celsius with no carrier gas, and approximately 70 nanometers per minute at 100° Celsius.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the diameter of the opening in the optical waveguides can be adjusted as needed for a specific application. Further, process parameters can be varied so as to create high aspect ratio holes with sufficient diameter and reflective layers of sufficient thickness for a particular application. Other appropriate materials and processes can be used to form the reflective layer of the optical waveguides. Further, it is noted that the waveguides can be used to transmit signals in either direction through a semiconductor wafer. Further, electronic systems can include more than two semiconductor wafers with sufficient optical waveguides formed through the semiconductor wafers to allow signals to be communicated between the integrated circuits of the various semiconductor wafers.

Advantageously, using optical waveguides according to the teachings of the present invention allows electronic systems to be constructed in less physical space compared to conventional electronic systems by removing the need for large printed circuit boards to interconnect various integrated circuits. This also provides the advantage of reducing the cost of packaging integrated circuits for a particular electronic system by allowing a number of circuits to be packaged together. Further, using the optical waveguides assures the electrical integrity of interconnections between integrated circuits by reducing the physical length of electrical interconnections between devices. This reduces concerns with signal loss or dissipation and interference with and by other intergrated circuitry devices.

What is claimed is:

1. An integrated circuit, comprising:
   at least one functional circuit formed on a wafer; and
   at least one optical waveguide formed in a high aspect ratio hole that extends through the wafer.
2. The integrated circuit of claim 1, further comprising:
   a layer of highly reflective material formed to line an inner surface of the high aspect ratio hole.
3. The integrated circuit of claim 1, wherein the optical waveguide is formed by an anodic etch that creates the high aspect ratio hole.
4. An integrated circuit, comprising:
   at least one functional circuit formed on a wafer;
   at least one optical waveguide formed in a high aspect ratio hole that extends through the wafer; and
   a layer of highly reflective material formed on an inner surface of the high aspect ratio hole.

5. The integrated circuit of claim 4, wherein the layer of highly reflective material comprises at least one layer of a metal.
6. The integrated circuit of claim 5, wherein the layer of highly reflective material comprises:
   a layer of tungsten formed on the inner surface of the high aspect ratio hole; and
   a layer of aluminum formed on the layer of tungsten.
7. An integrated circuit, comprising:
   at least one functional circuit formed on a wafer;
   at least one optical waveguide formed in a high aspect ratio hole that extend through the wafer; and
   a mirror-like layer including aluminum formed on an inner surface of the high aspect ratio holes.
8. The integrated circuit of claim 7, wherein the mirror-like layer has a thickness of approximately 300 angstroms.
9. The integrated circuit of claim 7, where the mirror-like layer is formed to provide a reflective surface that is substantially uniform.
10. The integrated circuit of claim 1, wherein at least one optical waveguide is adapted to receive optical signals from at least one optical transmitter.
11. The integrated circuit of claim 1, wherein at least one optical waveguide is adapted to transmit optical signals to at least one optical receiver.
12. An integrated circuit, comprising:
    at least one memory circuit formed on a wafer;
    at least one optical waveguide formed in a high aspect ratio hole that extends through the wafer, the high aspect ratio hole including an inner surface; and
    a layer of reflective material formed to line the inner surface of the high aspect ratio hole.
13. The integrated circuit of claim 12, wherein the wafer is adapted to be anodically etched to create the high aspect ratio hole.
14. The integrated circuit of claim 12, wherein the layer of reflective material has a thickness of approximately 300 angstroms.
15. The integrated circuit of claim 14, wherein the layer of reflective material includes a substantially uniform thickness.
16. An intergrated circuit, comprising:
    at least one memory circuit formed on a wafer;
    at least one optical waveguide formed in a high aspect ratio hole that extends through the wafer, the high aspect ratio hole including an inner surface; and
    a reflective aluminum layer to line the inner surface of the high aspect ratio hole.
17. The integrated circuit of claim 16, wherein the reflective aluminum layer has a substantially uniform thickness.
18. The integrated circuit of claim 17, wherein the reflective aluminum layer has a thickness of approximately 300 angstroms.
19. An integrated circlet, comprising:
    at least one fictional circuit formed on a wafer; and
    at least one optical waveguide formed in a high aspect ratio hole that extends through the wafer, the optical waveguide includes a diameter above a cut-off diameter for transmission of light waves.
20. The integrated circuit of claim 19, wherein the diameter of the optical waveguide is at least three times the cut-off diameter for transmission of light waves.
21. The integrated circuit of claim 19, wherein the diameter of the optical waveguide is ten times the cutoff diameter for transmission of light waves.

22. The integrated circuit of claim 19, wherein the diameter of the optical waveguide is six microns.

23. An integrated circuit, comprising:
   at least one functional circuit formed on a wafer; and
   at least one optical waveguide formed in a high aspect ratio hole that extends through the wafer, the optical waveguide includes a filling material that has an index of refraction greater than 1.0.

24. The integrated circuit of claim 23, wherein the optical waveguide includes a diameter above a cut-off diameter for transmission of light waves.

25. The integrated circuit of claim 23, wherein the high aspect ratio hole includes an inner surface, and wherein the optical waveguide includes a reflective aluminum layer lining the inner surface of the high aspect ratio hole.

26. The integrated circuit of claim 25, wherein the reflective aluminum layer has a substantially uniform thickness.

27. The integrated circuit of claim 25, wherein the reflective aluminum layer has a thickness of approximately 300 angstroms.

28. An integrated circuit, comprising:
   at least one memory circuit formed on a wafer;
   at least one optical waveguide formed in a high aspect ratio hole that extends through the wafer, the high aspect ratio hole including an inner surface; and
   a metallic mirror lining the inner surface of the high aspect ratio hole.

29. The integrated circuit of claim 28, wherein the metallic mirror has a substantially uniform thickness.

30. The integrated circuit of claim 29, wherein the metallic mirror layer has a thickness of approximately 300 angstroms.

31. The integrated circuit of claim 30, wherein the metallic mirror layer includes a layer of tungsten.

32. The integrated circuit of claim 31, wherein the metallic mirror layer includes a layer of aluminum.

33. The integrated circuit of claim 28, wherein the metallic mirror layer includes a layer of tungsten.

34. The integrated circuit of claim 33, wherein the metallic mirror layer includes a layer of aluminum.

35. The integrated circuit of claim 34, wherein the metallic mirror defines a diameter of the optical waveguide, and wherein the diameter is above a cut-off diameter for transmission of optical waves.

36. The integrated circuit of claim 34, wherein the diameter is at least three times a cut-off diameter for transmission of optical waves.

37. The integrated circuit of claim 34, wherein the diameter is ten times a cutoff diameter for transmission of an optical wave.

* * * * *

UNITED STATES PATENT AND TRADEMARK OFFICE
CERTIFICATE OF CORRECTION

PATENT NO. : 6,777,715 B1
DATED : August 17, 2004
INVENTOR(S) : Geusic et al.

It is certified that error appears in the above-identified patent and that said Letters Patent is hereby corrected as shown below:

Column 1,
Line 31, delete "tat" and insert -- that --, therefor.

Column 2,
Line 11, delete "fist" and insert -- first --, therefor.

Column 3,
Line 60, delete "hormonal" and insert -- horizontal --, therefor.

Column 6,
Line 17, delete "sure" and insert -- surface --, therefor.

Column 7,
Line 49, delete "intergrated" and insert -- integrated --, therefor.

Column 8,
Line 18, delete "where" and insert -- wherein --, therefor.
Line 43, delete "intergrated" and insert -- integrated --, therefor.
Line 56, delete "circlet" and insert -- circuit --, therefor.
Line 57, delete "fictional" and insert -- functional --, therefor.
Line 66, delete "cutoff" and insert -- cut-off --, therefor.

Column 9,
Line 6, delete "bole" and insert -- hole --, therefor.

UNITED STATES PATENT AND TRADEMARK OFFICE
CERTIFICATE OF CORRECTION

PATENT NO. : 6,777,715 B1
DATED : August 17, 2004
INVENTOR(S) : Geusic et al.

It is certified that error appears in the above-identified patent and that said Letters Patent is hereby corrected as shown below:

Column 10,
Line 23, delete "cutoff" and insert -- cut-off --, therefor.

Signed and Sealed this

Eighth Day of February, 2005

JON W. DUDAS
*Director of the United States Patent and Trademark Office*